(12) United States Patent
Berler et al.

(10) Patent No.: US 7,626,949 B2
(45) Date of Patent: Dec. 1, 2009

(54) METHOD AND DEVICE FOR SIMULTANEOUS MULTIPOINT DISTRIBUTING OF VIDEO, VOICE AND DATA

(76) Inventors: Tamir Berler, 19/4 Patay Street, Tel Aviv (IL); Avraham Sless, 18 Ya'ara Street, Even Yehuda (IL) 40500

( * ) Notice: Subject to any disclaimer, the term of this patent is extended or adjusted under 35 U.S.C. 154(b) by 554 days.

(21) Appl. No.: 10/468,770

(22) PCT Filed: Feb. 17, 2002

(86) PCT No.: PCT/IL02/00118

§ 371 (c)(1),
(2), (4) Date: Jan. 6, 2004

(87) PCT Pub. No.: WO02/067501

PCT Pub. Date: Aug. 29, 2002

(65) Prior Publication Data

US 2004/0100915 A1    May 27, 2004

(51) Int. Cl.
*H04L 12/16* (2006.01)
*H04N 7/14* (2006.01)

(52) U.S. Cl. ............... 370/259; 370/400; 370/352; 348/14.08

(58) Field of Classification Search ........... 370/259, 370/352, 400, 260, 261; 348/14.01–14.09, 348/14.1, 14.11, 14.12, 14.13
See application file for complete search history.

(56) References Cited

U.S. PATENT DOCUMENTS

| | | | | |
|---|---|---|---|---|
| 6,088,732 A | * | 7/2000 | Smith et al. | 709/229 |
| 6,728,753 B1 | * | 4/2004 | Parasnis et al. | 709/203 |
| 6,774,927 B1 | * | 8/2004 | Cohen et al. | 348/14.1 |

* cited by examiner

*Primary Examiner*—Melur Ramakrishnaiah

(57) ABSTRACT

The present invention provides a system and a method for distributing video, voice and data simultaneously to multiple end-points over packet switching networks, compliant with the H.323 standard. A customer connecting to the H.323 compliant LAN receives a copy of datagram stream produced by a one-to-many proxy server (OTMPS). Control is granted to a customer, subject to permission by a control module, also connected to the LAN.

5 Claims, 4 Drawing Sheets

METHOD AND DEVICE FOR SIMULTANEOUS MULTIPOINT DISTRIBUTING OF VIDEO, VOICE AND DATA

TECHNICAL FIELD OF THE INVENTION

The present invention relates generally to video transmission over internet protocol compliant networks. More specifically the invention deals with simultaneous distribution to multiple end-points of video on such networks.

BACKGROUND OF THE INVENTION

Videoconferencing is defined as a technique for intercommunicating two or more audiovisual end-points interactively, such that video is facilitated between the parties involved. Full two-way audio and video is costly and requires analog video channels or high capacity digital channel. Present day videoconferencing is implemented by using either IP networks or ISDN. A more common configuration is that of Interactive TV, which includes full service out, audio only in. The components of a videoconferencing system end-point is a camera, microphone, video display. Generally, to transmit the required data effectively, a large bandwidth is necessary. It is however possible to use a codec (Compression/Decompression) device, to compress the audio signal and thus get more data for the same available bandwidth. If more then two end-points are involved, a component called MCU (Multipoint Conferencing Unit) must be employed. Such a component is implemented either in software or in hardware, and it allows more than one user to be on the screen at one time. Some such commercial devices can show a multiplicity of users simultaneously, whereas others will switch only to the person who is speaking.

Industry accepted standards for facilitating videoconferencing interconnectivity. The standards are endorsed by the ITU (International Telecommunications Union). The standards are based upon the networking medium that is used to transmit audio, video and data associated with videoconferencing. The H.323 standard is the most common video conferencing standard, implemented in Ethernet and Token-ring LANs, it is used in connection with the IP protocol transport. The H.320 standard relates to multimedia and videoconferencing over ISDN lines.

DETAILED DESCRIPTION OF THE PRESENT INVENTION

Figure 1:
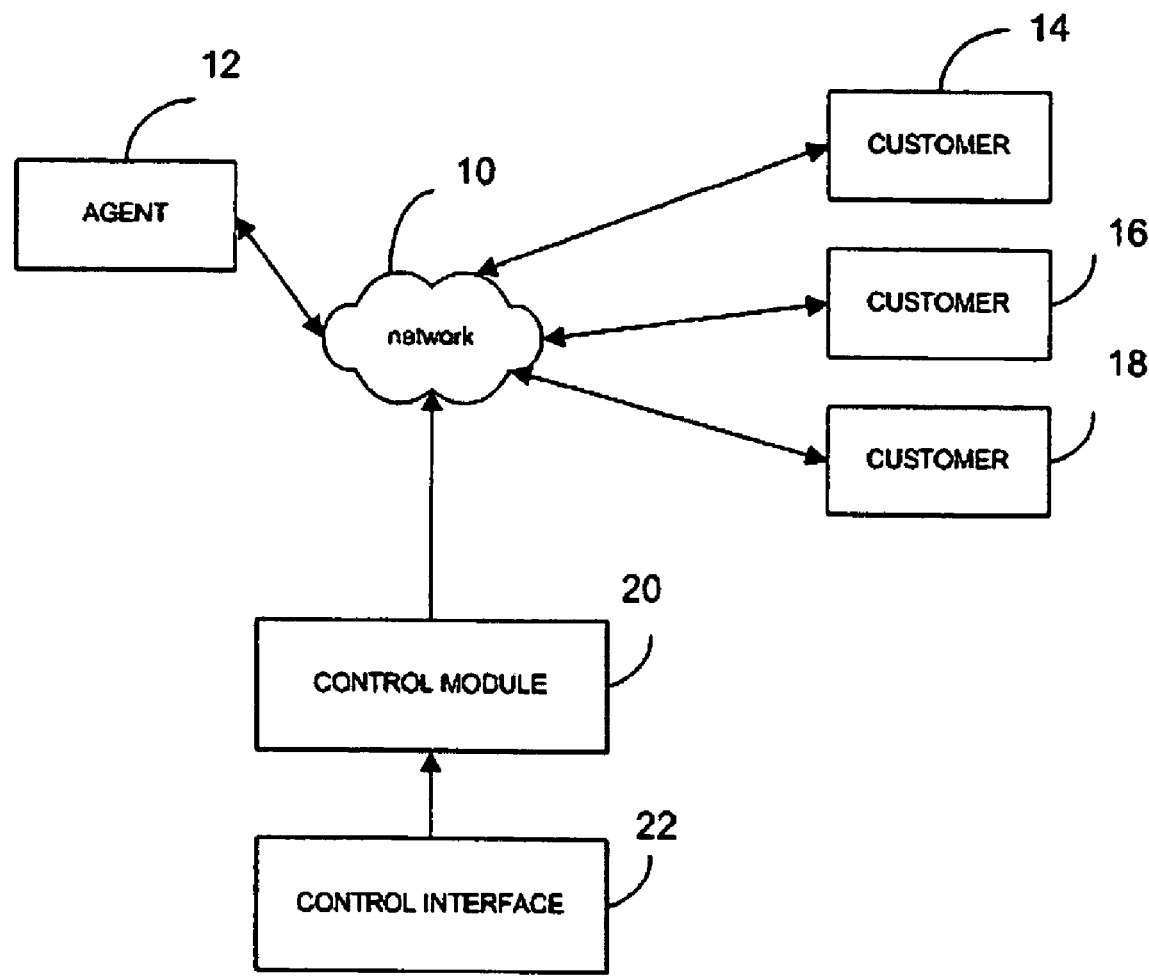
FIG. 1 is a general layout of the components of a network according to the present invention.

In the framework within which the present invention is implemented, several components are employed, as described schematically in FIG. 1 to which reference is now made. To a network 10 are connected several components. Agent 12 is the party that supplies the information, to customers 14, 16 and 18. Control module 20 interprets commands coming from control interface 22, to affect transmission of information from agent 12 to the customers.

Figure 2:
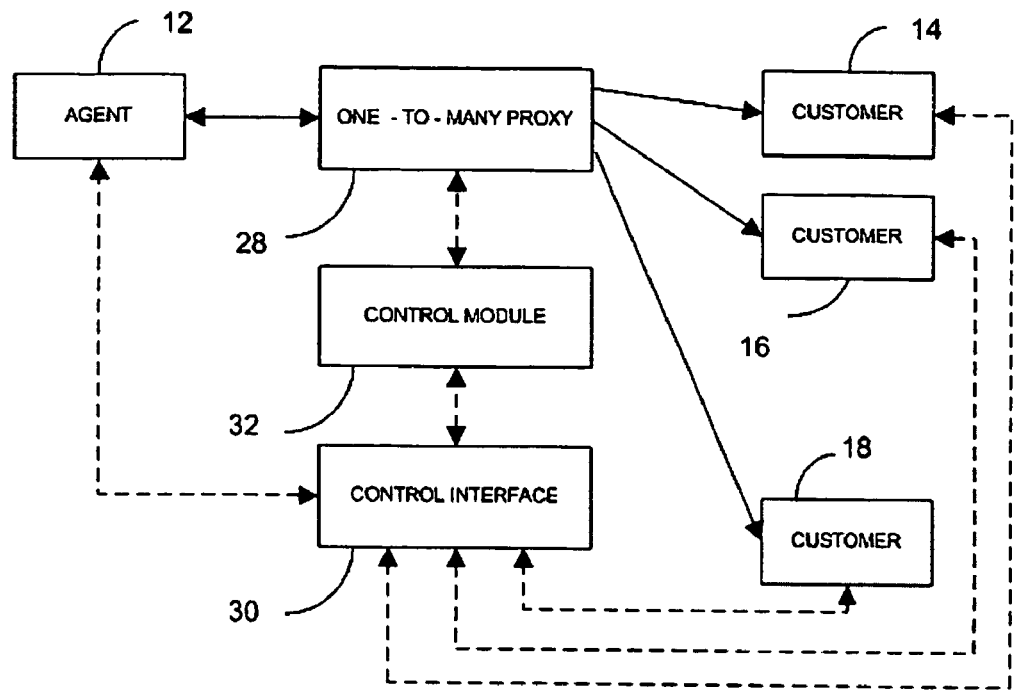
FIG. 2 is a block diagram showing the interactions between the components of a system of the present invention.

In FIG. 2, to which reference is now made, are described the information routes and the control channels of the system according to a preferred embodiment of the invention. Agent 12 transfers information to a one-to-many proxy server 28, thereafter referred to as OTMPS, which distributes the information to customers 14, 16, and 18. Control channels are indicated in dashed arrows, whereas solid arrows represent information flow. Agent 12 sends instructions to a control interface 30 and receives instructions from same. Control interface 30 sends control instructions to control module 32, and OTMPS receives control instructions from control module 32. Customers 14, 16 and 18 send control instructions to the control interface 30. In another embodiment, the agent 12 does not have a direct connection to control interface 30, and its interface with the system of the invention is effected exclusively through the OTMPS 28.

Figure 3A:
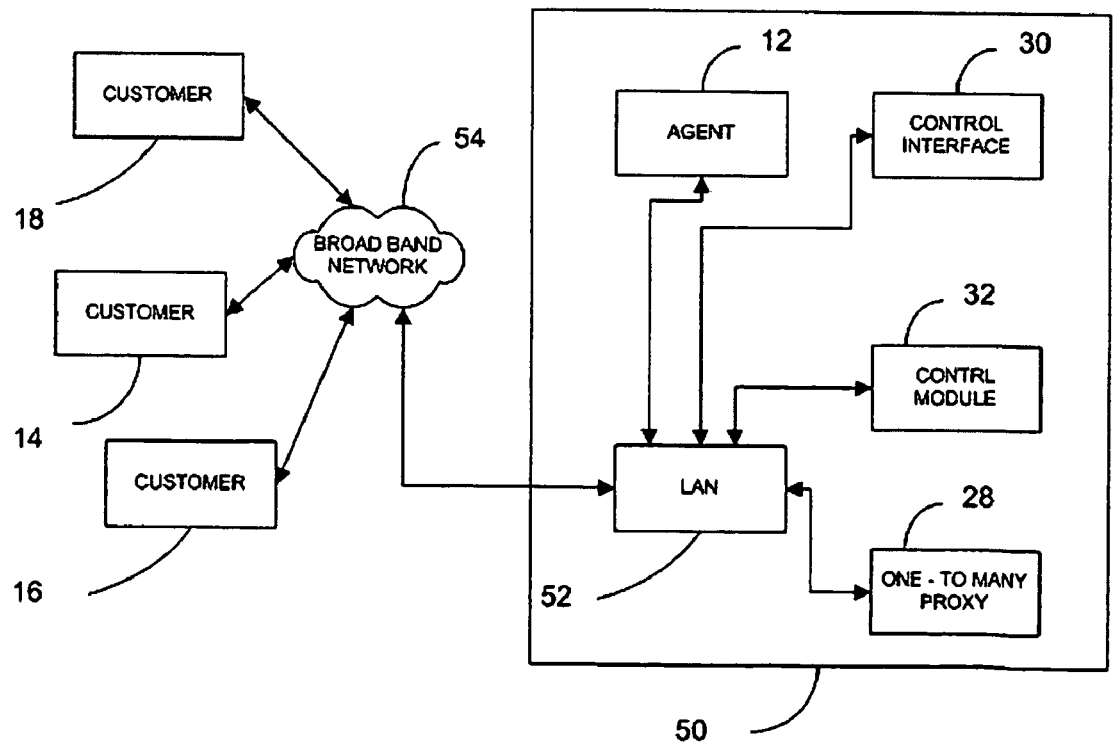
FIG. 3A is a block diagram describing the components of a service provider premises in connection with external network.
Figure 3B:
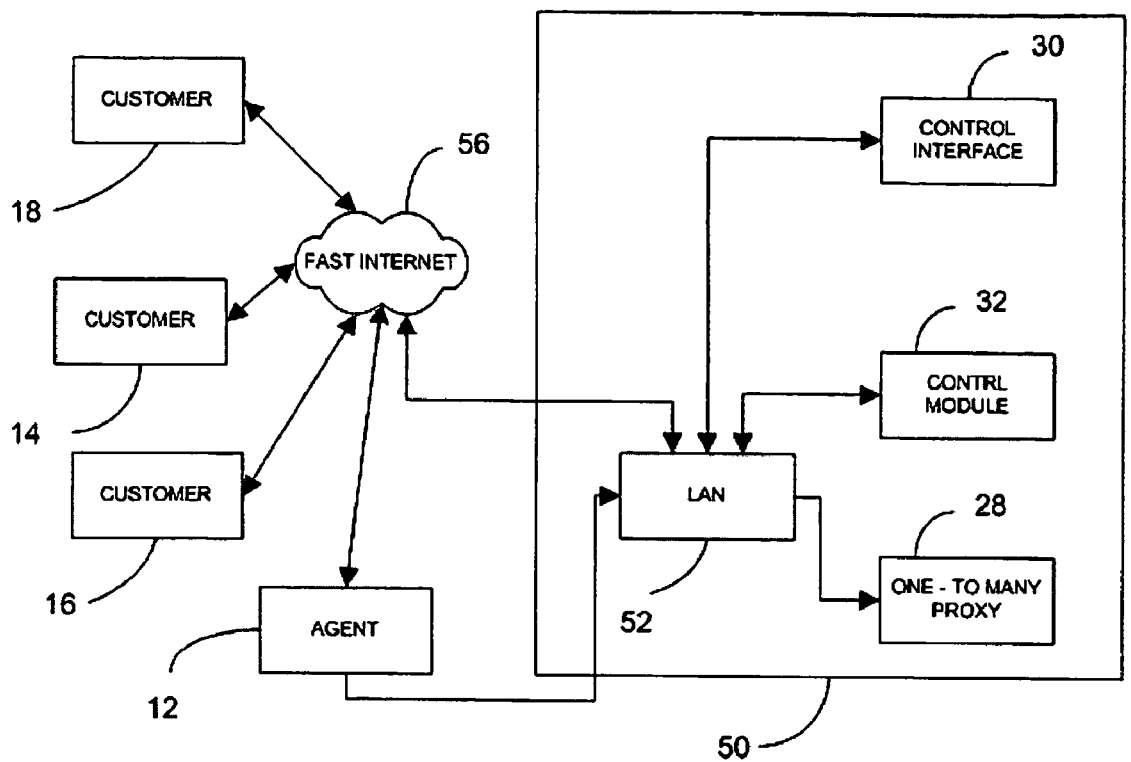
FIG. 3B is a block diagram describing the components of a service provider premises in connection with external network, with the agent connected through the external network.

Reference is now made to FIG. 3A, which shows the architectural features of a system of a preferred embodiment of the invention. In the premises 50 of the service provider, an agent 12 is connected to a LAN 52. To the outside, the LAN 52 is connected to a broad band network 54, to which customers 14, 16, and 18 are also connected. In the service provider's premises 50, control interface 30 is connected to the LAN 52, control module 32 is connected to the LAN 52 and OPTMS 28 is connected to the LAN 52 as well. FIG. 3B to which reference is now made, shows a slightly different embodiment of the invention in which the agent 12 does not necessarily reside within the service provider premises. In this case, the connection of agent 12 with the LAN 52 is mediated through the fast internet network 54.

Figure 4:
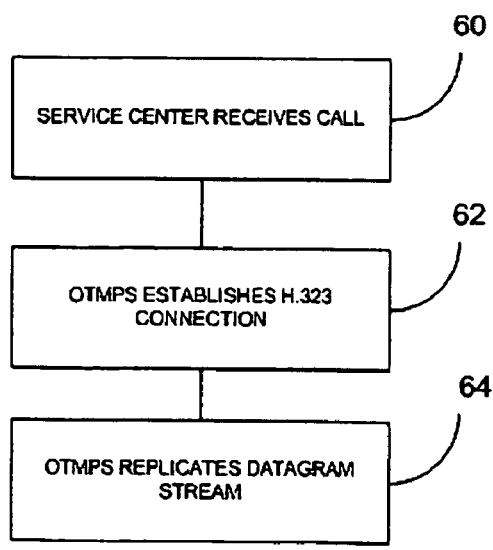
FIG. 4 is a flow diagram showing the sequence of events that leads to a contact between a customer and a agent according to an embodiment of the invention.

To explain the functionality of the present invention, reference is now made to FIG. 4, which describes the sequence of events taking place in a videoconferencing session performed in accordance with the present invention. A customer wishes to join an ongoing video, audio and data transfer session and calls service provider center in step 60. In step 62, the OTMPS establishes a H.323 connection with the calling customer. As a consequence, in step 64, the control module instructs the OTMPS to produce another copy of the datagram stream representing the transmitted information between the customers and the agent.

When a customer wishes to join an ongoing agent-to-customer video, audio and data transfer session, his call, made through a broad band network or through an ISDN network to the service provider, must be received there. If an ISDN has been used for access according to the present invention, a gateway has to be employed using as an interface between the two networks (ISDN and LAN). At this point in time, the new customer is passively connected to the customer and obtains video, audio and data like the other customers, having been connected before.

Figure 5:
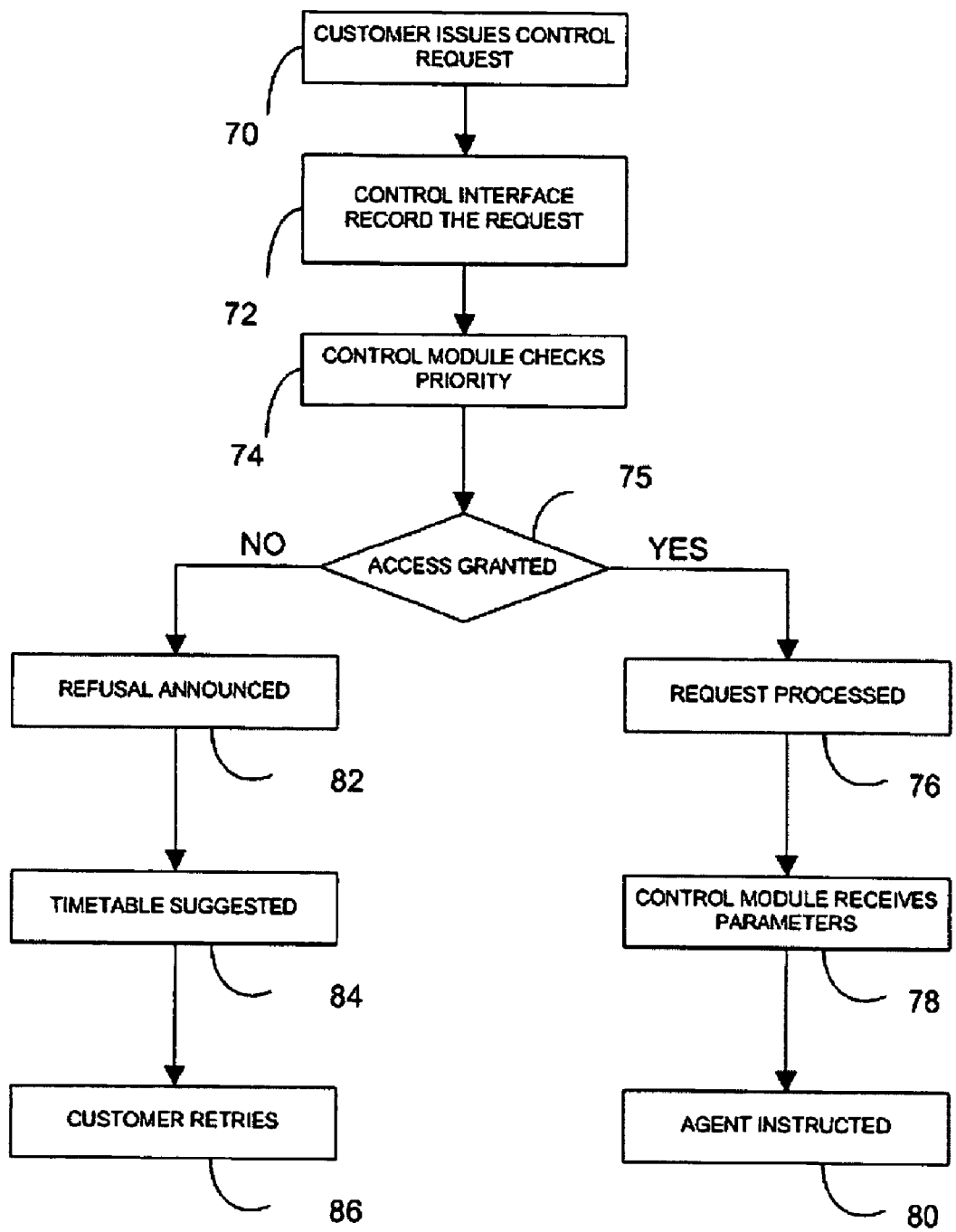
FIG. 5 is a flow diagram showing the sequence of events that leads to a control over the agent as consequence of issuance of request by the customer.

In accordance with a preferred embodiment of the present invention, whenever a connected customer wishes to instruct the agent to change the course of an ongoing session, such as provide a new source of information conveyed to the customers through the LAN, he then issues a control request. A suitable interface for such a request is a PC for a internet connection, or a video telephone for an ISDN connection. FIG. 5, to which reference is now made, describes one approach for implementing a client takeover of an ongoing session. At step 70 the customer issues the request for control and at step 72 the control interface records the request. At step 74 the control module checks the priority parameters available for the registered customer, and in step 75 control access is granted depending upon the calling customer's priority parameters, a number of existing customers' parameters and on network parameters. In step 76 the request is processed, and in step 78 the control interface is given parameters for changing the ongoing agent output. In step 80, the agent is provided with a set of parameters as to the changes which are to be made effective. If access is not granted to the customer in step 75, refusal is announced in step 82, through customer's audio or video interface, and suggesting a timetable for interaction, based upon an updated timetable, at step 84. At step 86 the customers retries to control the interaction with the agent.

The invention claimed is:

1. A system for connecting at least one customer to at least one agent to facilitate transmission of information, including at least one selected from the group consisting of video, audio and data, or any combination thereof, said connecting performed through a LAN complying with the H.323 standard, the system comprising:

a control interface for connecting and mediating control instructions between said at least one customer and said at least one agent;

a control module for obtaining information from said control interface including the number of customers connected to said system and an address and priority parameter of each customer; and a one-to-many proxy server for receiving instructions from said control module regarding the number of customers connected and their priority parameters, and producing a datagram stream representing the transmitted information between said customer and said agent;

wherein said control module instructs said one-to-many proxy server to produce another copy of a datagram stream, representing the transmitted information between said customer and said agent, for a customer joining an ongoing video, audio and data transfer session.

2. A system as in claim 1, wherein said interface comprises a control interface connected to said LAN for conveying and mediating control instructions between said at least one customer and said at least one agent.

3. A method for connecting a new customer to an ongoing session in which information is transferred from at least one agent to at least one customer through a one-to-many proxy server, to facilitate transmission of said information selected from a group consisting of video, audio and data, or any combination thereof, to said customer, said connecting being compliant with a videoconferencing standard, the method comprising:

receiving a call issued by said new customer in a control interface;

establishing an H.323 call with said new customer;

notifying a control module by said control interface about the newly established customer call;

receiving instructions by said one-to-many proxy server from said control module regarding the number of customers connected to said session and the priority parameters of those customer;

producing a copy by said one-to-many proxy server, of a datagram stream representing the transmitted information between at least one customer participating in the session and the at least one agent; and transmitting the copy of the datagram stream to said new customer.

4. A method as in claim 3, and wherein said videoconferencing standard is an H.323 standard.

5. A method as in claim 4, wherein said videoconferencing standard is an H.320 standard, for connecting ISDN communications carrier through a gateway to a LAN.

* * * * *